United States Patent
Amiri et al.

(10) Patent No.: US 9,632,762 B2
(45) Date of Patent: *Apr. 25, 2017

(54) EXTENDING SUPERWORD LEVEL PARALLELISM

(71) Applicant: International Business Machines Corporation, Armonk, NY (US)

(72) Inventors: Ehsan Amiri, Seattle, WA (US); Christopher M. Barton, Stouffville (CA); Yaoqing Gao, North York (CA); Denis M. Palmeiro, Milton (CA); Raul E. Silvera, Dublin, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,920

(22) Filed: Feb. 17, 2015

(65) Prior Publication Data
US 2015/0317141 A1    Nov. 5, 2015

Related U.S. Application Data

(63) Continuation of application No. 14/267,268, filed on May 1, 2014.

(51) Int. Cl.
*G06F 9/45*    (2006.01)
*G06F 9/30*    (2006.01)

(52) U.S. Cl.
CPC ............. *G06F 8/456* (2013.01); *G06F 8/443* (2013.01); *G06F 8/445* (2013.01); *G06F 8/45* (2013.01); *G06F 9/30036* (2013.01)

(58) Field of Classification Search
CPC . G06F 8/45; G06F 8/443; G06F 8/445; G06F 8/456; G06F 9/30036; G06F 8/40; G06F 8/41; G06F 8/4441
See application file for complete search history.

(56) References Cited

U.S. PATENT DOCUMENTS

| 7,100,155 B1 * | 8/2006 | Wu | ........................ G06F 8/443 717/130 |
|---|---|---|---|
| 7,882,325 B2 * | 2/2011 | Sperber | ............... G06F 9/30036 711/167 |

(Continued)

OTHER PUBLICATIONS

Yang, M., et al., A Technology Based Benefit Analysis on Reuse of Vector Register for SIMD Vectorization Optimization, 2010 International Symposium on Information Science and Engineering (ISISE), 2010, pp. 101-104, [retrieved on Sep. 7, 2016], Retrieved from the Internet: <URL:http://ieeexplore.ieee.org/>.*

(Continued)

*Primary Examiner* — Geoffrey St Leger
(74) *Attorney, Agent, or Firm* — Maeve Carpenter (57) ABSTRACT

A computer identifies one or more pairs of scalar statements and performs a cost analysis of operations of each of the one or more pairs of scalar statements to determine both a benefit and a cost of operations. The computer determines, based, at least in part, on the cost analysis, a gain for each of the one or more pairs of scalar statements. The computer creates based, at least in part, on the gain, a sorted list of each of the one or more pairs of scalar statements and selects a first pair from the sorted list. The computer issues a query to a hash table using a statement of the first pair and selects from results received from the query, a second pair. The computer then extends, based, at least in part, on the second pair, the first pair to create a pack.

5 Claims, 4 Drawing Sheets

(56) References Cited

U.S. PATENT DOCUMENTS

| | | | |
|---|---|---|---|
| 8,010,953 B2 | 8/2011 | Gschwind | |
| 8,136,105 B2 | 3/2012 | Eichenberger et al. | |
| 8,196,127 B2 | 6/2012 | Gschwind | |
| 8,201,159 B2* | 6/2012 | Gschwind | G06F 8/445 717/151 |
| 8,266,587 B2 | 9/2012 | Eichenberger et al. | |
| 8,954,943 B2* | 2/2015 | Eichenberger | G06F 8/443 712/22 |
| 8,959,497 B1* | 2/2015 | Stratton | G06F 8/456 717/140 |
| 2005/0273769 A1 | 12/2005 | Eichenberger et al. | |
| 2006/0195828 A1* | 8/2006 | Nishi | G06F 8/456 717/140 |
| 2007/0169058 A1 | 7/2007 | Eichenberger et al. | |
| 2008/0052688 A1* | 2/2008 | O'Brien | G06F 8/443 717/140 |
| 2008/0092124 A1* | 4/2008 | Archambault | G06F 8/445 717/140 |
| 2009/0307656 A1* | 12/2009 | Eichenberger | G06F 8/45 717/110 |
| 2010/0070958 A1* | 3/2010 | Takagi | G06F 8/456 717/149 |
| 2012/0079469 A1* | 3/2012 | Gonion | G06F 8/456 717/160 |
| 2015/0378696 A1* | 12/2015 | Boehm | G06F 8/45 717/149 |

OTHER PUBLICATIONS

Larsen, S., et al., Exploiting Superword Level Parallelism with Multimedia Instruction Sets, Proceedings of the ACM SIGPLAN 2000 conference on Programming language design and implementation, 2000, pp. 145-156, [retrieved on Sep. 7, 2016], Retrieved from the Internet: <URL:http://dl.acm.org/>.*

"A builtin to improve compiler generated SIMD code", IPCOM000018651D, Jul. 30, 2003, http://ip.com/IPCOM/000018651.

Chen, et al., "An Automatic Superword Vectorization in LLVM", Department of Computer Science, National Chiao Tung University, downloaded on Jan. 22, 2014, http://www.cis.nctu.edu.tw/~wuuyang/papers/mypaper-ZAKK.pdf.

Eichenberger, et al., "Optimizing Compiler for a CELL Processor", Proceedings of the 14th International Conference on Parallel Architectures and Compilation Techniques (PACT'05), Copyright 2005.

Liu, et al., "A Compiler Framework for Extracting Superword Level Parallelism", Proceedings of the 33rd ACM SIGPLAN conference on Programming Language Design and Implementation, pp. 347-358, ISBN: 978-1-4503-1205-9, Copyright 2012.

Shin, "Compiler Optimizations for Architectures Supporting Superword-Level Parallelism", University of Southern California, ISBN:0-542-42760-5, Aug. 2005.

Tenllado, et al., "Improving Superword Level Parallelism Support in Modern Compilers", Third IEEE/ACM/IFIP International Conference on Hardware/Software Codesign and System Synthesis, pp. 303-308, Sep. 2005.

Westen, "Simdization transformation strategies", Computer Engineering, Faculty of Electrical Engineering, Mathematics and Computer Science, Sep. 17, 2012.

Appendix P (List of IBM Patents or Patent Applications Treated As Related).

U.S. Appl. No. 14/267,268, entitled "Extending Superword Level Parallelism", filed May 1, 2014.

Sun et al., "", 2011 15th Workshop on Interaction between Compilers and Computer Architectures, 9 pages, Retrieved on Mar. 28, 2016 from <http://ieeexplore.ieee.org/stamp/stamp.jsp/?tp=&arnumber=5936720>.

Zhang, et al. "An Open64-based cost analytical model in auto-vectorization", 2010, ICEIT; retrieved on May 5, 2015, Retrieved from Internet <URL: http:ieeexplore.ieee.org/stamp/stamp.jsp?tp=&ar number=5608348>; pp. V3-377-V3-381.

Yang, et al., "A Technology Based Benefit Analysis on Reuse of Vector Register for SIMD Vectorization Optimization", 2010 International Symposium on Information Science and Engineering (ISISE), 2010, pp. 101-104, retrieved on Sep. 7, 2016, Retrieved from Internet <URL:http://ieeexplore.ieee.org/>.

Larsen, et al., "Exploiting Superworld Level Parallelism with Multimedia Instruction Sets", Proceedings of the ACM SIGPLAN 2000 Conference on Programming language Design and Implementation, 2000, pp. 145-156, retrieved on Sep. 17, 2016, Retrieved from Internet <URL:http://dl.acm.org/>.

* cited by examiner

EXTENDING SUPERWORD LEVEL PARALLELISM

FIELD OF THE INVENTION

The present invention relates generally to the field of vectorization and compiler technology, and more particularly to extending superword level parallelism.

BACKGROUND OF THE INVENTION

The increasing importance of multimedia applications in embedded and general purpose computing environments has led to the development of multimedia extensions in most commercial microprocessors. At the core of these extensions is support for vector, or single-instruction-multiple-data ("SIMD") operations on superwords, that is, aggregate data objects larger than a machine word. SIMD units are still most effectively exploited by using SIMD data-types in the source code and restructure algorithms accordingly. Compilers have evolved in order to efficiently exploit the unique features of multimedia extensions, specifically through use of the Superword Level Parallelism ("SLP") approach.

SLP is a compiler transformation that searches inside a basic block of user code in an attempt to find sets of scalar, isomorphic statements that can be packed and replaced by a SIMD statement expecting improvement in the performance of the user code. SLP can be defined as short SIMD parallelism, or basic block simdization, in which the source and result operands of a SIMD operation are packed in an adjacent storage location.

SUMMARY

Embodiments of the present invention disclose a method, computer system, and computer program product for a computer identifying one or more pairs of scalar statements and performing a cost analysis of operations of each of the one or more pairs of scalar statements to determine both a benefit and a cost of operations. The computer determines, based, at least in part, on the cost analysis, a gain for each of the one or more pairs of scalar statements. The computer creates based, at least in part, on the gain, a sorted list of each of the one or more pairs of scalar statements and selects a first pair from the sorted list. The computer issues a query to a hash table using a statement of the first pair and selects from results received from the query, a second pair. The computer then extends, based, at least in part, on the second pair, the first pair to create a pack.

DETAILED DESCRIPTION

SLP, also known as basic block simdization, is a compiler transformation that searches inside a basic block of user code to find sets of scalar statements that can be packed and replaced by a SIMD statement that may improve performance of the user code. SLP identifies isomorphic statements, which satisfy two conditions: first, same operators are applied in the same order, and second, operands of corresponding operators are adjacently stored in memory. Standard SLP methods to identify statements for packing containing operands in non-adjacent memory locations can result in missed opportunities for optimal selection of statements. Embodiments of the present invention recognize that SLP could benefit from a method to identify statements for packing that considers statement components in non-adjacent memory locations and also performs a cost-benefit analysis prior to generating SIMD code for scheduled packs.

Figure 1:
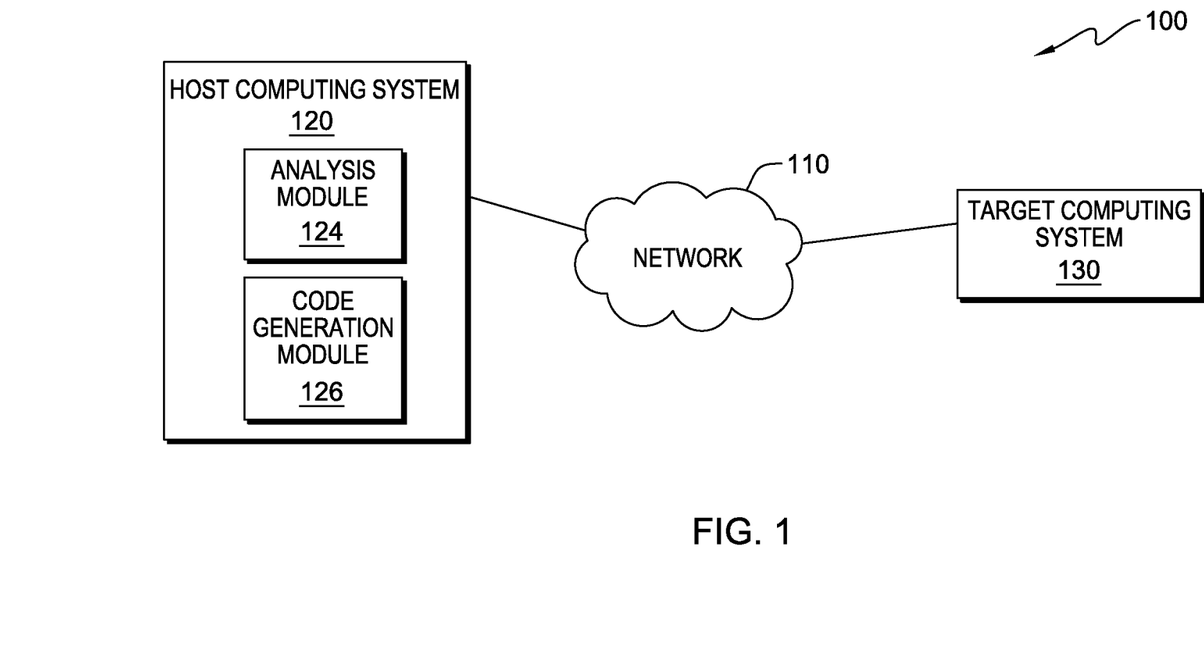
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes host computing system 120 and target computing system 130, interconnected via network 110. In various embodiments of the present invention, distributed data processing environment 100 may be a parallel computing system, a distributed computing system, an embedded computing system, or any other computing system or group of networked computers which can communicate via network 110. Network 110 can be, for example, a local area network (LAN), a wide area network (WAN), such as the Internet, a virtual local area network (VLAN), or any combination of the three, and can include wired, wireless, or fiber optic connections. In general, network 110 can be any combination of connections and protocols that will support communications between host computing system 120 and target computing system 130, in accordance with embodiments of the present invention.

In various embodiments of the present invention, host computing system 120 may be a management server, a web server, or any other electronic device or computing system capable of receiving and sending data. In other embodiments, host computing system 120 may represent a server computing system utilizing multiple computers as a server system, such as in a cloud computing environment. In another embodiment, host computer system 120 may be a laptop computer, a tablet computer, a netbook computer, a personal computer (PC), a desktop computer, or any programmable electronic device capable of running compiler software and of communicating with target computing system 130 and other devices and components within distributed data processing environment 100. In another embodiment, host computing system 120 represents a computing system utilizing clustered computers and components (e.g., database server computer, application server computers, etc.) that act as a single pool of seamless resources when accessed within distributed data processing environment 100.

Host computing system includes analysis module 124 and code generation module 126. Analysis module 124 is a compiler operation that identifies opportunities to improve performance of source code by evaluating pairs of scalar statements to create a list of pairs of statements and each pair's associated estimated gain. From the list, analysis module 124 creates and populates two hash tables with keys corresponding to a left and a right component of a pair. Analysis module 124 selects a first unused pair of statements from the list and queries the hash tables. From each hash table, an unused pair with the highest gain is returned, and if a data size of each returned pair is less than the size of the SIMD register on a target platform, the returned pairs are used to extend the selected pair to create a pack. When the pack contains a required number of statements, analysis module 124 sets used flags on the pack and the statements that make up the pack. Code generation module 126 determines whether to schedule the original scalar statement or to schedule generated SIMD code for the pack based on a cost analysis of the pack. In an embodiment, analysis module 124 and code generation module 126 operate as an extension of a standard SLP compiler. An SLP compiler is a computer program capable of supporting and performing superword level parallelism ("SLP") operations, also defined as short SIMD parallelism where the source and result operands of a SIMD operation are packed in a storage location. In various embodiments, analysis module 124 and code generation module 126 may be incorporated in one module for operation with distributed data processing environment 100.

In various embodiments of the present invention, target computing system 130 may be a management server, a web server, or any other electronic device or computing system capable of receiving and sending data. In other embodiments, target computing system 130 may represent a server computing system utilizing multiple computers as a server system, such as in a cloud computing environment. In another embodiment, target computing system 130 maybe be a laptop computer, a tablet computer, a netbook computer, a personal computer (PC), a desktop computer, or any programmable electronic device capable of receiving and running compiler output and of communicating with host computing system 120 and other devices and components within distributed data processing environment 100. In another embodiment, target computing system 130 represents a computing system utilizing clustered computers and components (e.g., database server computer, application server computers, etc.) that act as a single pool of seamless resources when accessed within distributed data processing environment 100. In an exemplary embodiment, target computing system 130 includes a target platform and SIMD register for compiled code. While the embodiment depicted in FIG. 1 includes target computing system 130, distributed data processing environment 100 may include only host computing system 120, or may include multiple other computing systems or computing devices capable of communicating with host computing system 120 via network 110.

Figure 2:
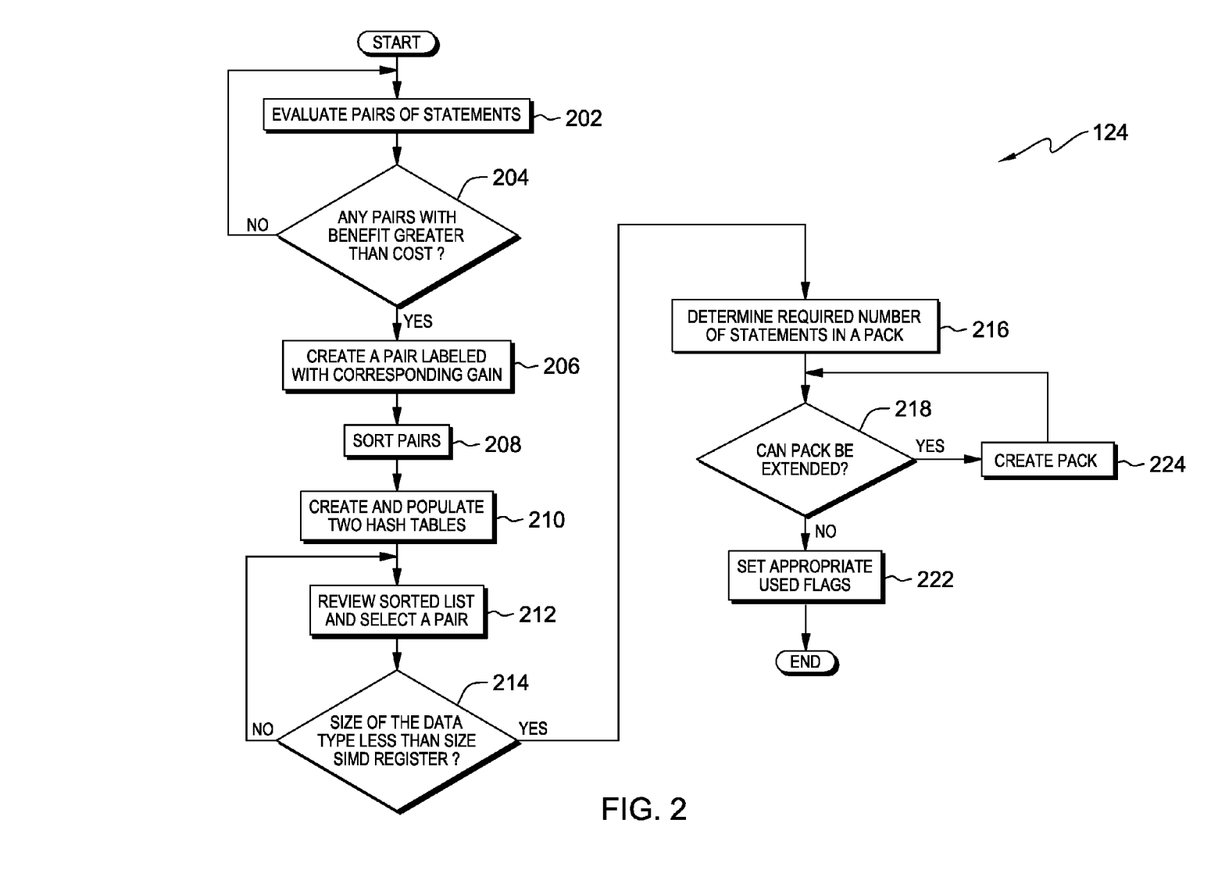
FIG. 2 is a flowchart depicting operational steps of an analysis module, in accordance with an embodiment of the present invention.

FIG. 2 is a flowchart depicting operational steps of analysis module 124 for extending superword level parallelism, in accordance with an embodiment of the present invention.

Analysis module 124 evaluates pairs of statements (step 202). Analysis module 124 identifies and compares pairs where the statements have the same operators applied in the same order. The pairs are evaluated by performing a cost analysis first to estimate whether there is a benefit from parallelizing operations and next to estimate the cost of gathering operands for the operations. The cost of gathering operands varies based on the location of the operands, for example, the cost of loading two memory adjacent operands is less than the cost of loading two operands which are in two different locations in memory, which includes a runtime cost. The estimated gain, based on the benefit gained minus the cost, is calculated. In an embodiment, in order to speed up the evaluation of pairs, a hash function can be defined based, at least in part, on operators used in each statement and a position of the operators in the statement. Based on the hash function, a hash value can be assigned to each statement and only pairs with a same hash value are considered for evaluation.

Analysis module 124 determines whether there are any pairs with an estimated benefit greater than an estimated cost (decision block 204). The cost analysis determines (1) how many arithmetic or logical operations are saved by creating the pair and compares the result with (2) how many permute or splat operations will be needed to create vector inputs for the created pair and scattering the output from vector form to scalar form. The operations discussed can vary based on the hardware present, different hardware may have different operations for gathering and scattering scalar values to and from a vector. In each of (1) and (2) an estimated number is assigned to each operation to indicate the benefit and cost, respectively. If there are no pairs with a benefit greater than cost (decision block 204, "no" branch), then analysis module 124 returns to evaluate further pairs of statements. If there are pairs with an estimated benefit greater than an estimated cost (decision block 204, "yes" branch), then analysis module 124 creates a pair labeled with a corresponding estimated gain (step 206). The pair of corresponding statements, S1 and S2, for example, is represented as a pair (S1, S2), and labeled with estimated gain, G. The estimated gain is the difference between the benefit and the cost.

Analysis module 124 sorts pairs (step 208). Each pair of statements created is sorted by the estimated gain, G. In an exemplary embodiment, the pairs are sorted by decreasing order of G.

Analysis module 124 creates and populates two hash tables (step 210). With each hash table, the key is a statement. For a first hash table, given a key S1, the value is a list of pairs (S1, S), and for a second hash table, the value is a list of pairs (S, S1). In order to populate each hash table, the sorted list of pairs is reviewed and a given pair, for example, (S1, S2), is inserted in the first hash table with S1 as the key. If key S1 already exists in the first hash table, (S1, S2) is appended to the end of the previously existing list. If key S1 does not yet exist in the first hash table, a list of size one is created including (S1, S2). A query to the first hash table with key S1 returns a list of pairs of statements with S1 as the first component in decreasing order of gain, G. In the second hash table, S2 is used as the key and the pair (S1, S2) is inserted as a value into the table.

Analysis module 124 reviews the sorted list of pairs and selects a pair (step 212). Analysis module 124 reviews the sorted list in order to select a pair for evaluation for generating a pack. In the exemplary embodiment, analysis module 124 selects initially the first unused pair from the list, for example, (S1, S2, G). Each pair has a flag that indicates whether it is used in a pack or not, and each statement object has a flag that indicates whether it is used in a pack. Initially, flags for each pair and each statement are off, indicating no pair or statement is used in a pack. When selecting a pair, analysis module 124 checks the flag of the pair and the statements within the pair, in order to make sure a statement is not used multiple times.

Analysis module 124 determines whether the data type size of the selected pair, for example, (S1, S2) is less than the size of an available SIMD register on the target platform (decision block 214). If the data type size of both statements in the selected pair is equal to the size of the SIMD register on the target platform, i.e., (S1 size+S2 size=SIMD register size) (decision block 214, "no" branch), the pair is returned as a pack and analysis module 124 returns to select another pair. If the data type size of both statements in the selected pair is greater than the size of the SIMD register, the pair cannot be extended and analysis module 124 returns to select another pair. If the data type size is less than the size of the SIMD register (decision block 214, "yes" branch), analysis module 124 determines a required number of statements in the pack (step 216). The required number of statements is determined based on the size of the target SIMD register. For example, each statement in a pair has a data type with a fixed length. The number of statements in one pack must be equal to the size of the SIMD register divided by the size of the data type.

Analysis module 124 determines whether the pair can be extended (decision block 218). If the required number of statements is not included in the pack, then the pair can be extended (decision block 218, "yes" branch), and the pack created (step 224). For example, if the SIMD register is four times larger than the data type, the pair can be extended. In order to extend the pair (S1, S2), analysis module 124 issues two queries to the hash tables. A first query returns a sorted list of each tuple with S1 as the second component, to capture the (S, S1) tuples. A second query returns a sorted list of each tuple with S2 as the first component, to capture the (S2, S) tuples. In the exemplary embodiment, the returned sorted lists are sorted in decreasing order of estimated gain, G. From the first sorted list, analysis module 124 selects the first unused pair with the highest gain, which may be (S3, S1), and from the second sorted list, analysis module 124 selects the first unused pair with the highest gain, which may be (S2, S4). One pair of the selected pairs is chosen based on the gain to create a pack containing three statements. If the selected pair from the first list is chosen, the pack will be (S3, S1, S2) and if the selected pair from the second list is chosen, the pack will be (S1, S2, S4). In an embodiment, a pair cannot be extended if there are no statements that can be used for the extension, for example, (S1, S2) cannot be extended because there is no (S, S1) and no (S2, S) available.

If the required number of statements is included in the pack, then the pack can no longer be extended (decision block 218, "no" branch) and analysis module 124 sets appropriate used flags (step 222). A used flag is only set for completed packs, and if not enough pairs are identified to complete a pack with the required number of statements, the used flag is set for the first selected pair, but not for the statements in that pair and not for other pairs. For complete packs, the used flag is set for each pair and each statement in the pack to indicate whether or not each is used in a pack. Flags are set accordingly in order to avoid the process falling into an infinite loop where analysis module 124 starts from the same pair repeatedly and fails to make a complete pack from it. The flags protect from reusing one statement in two different packs.

Figure 3:
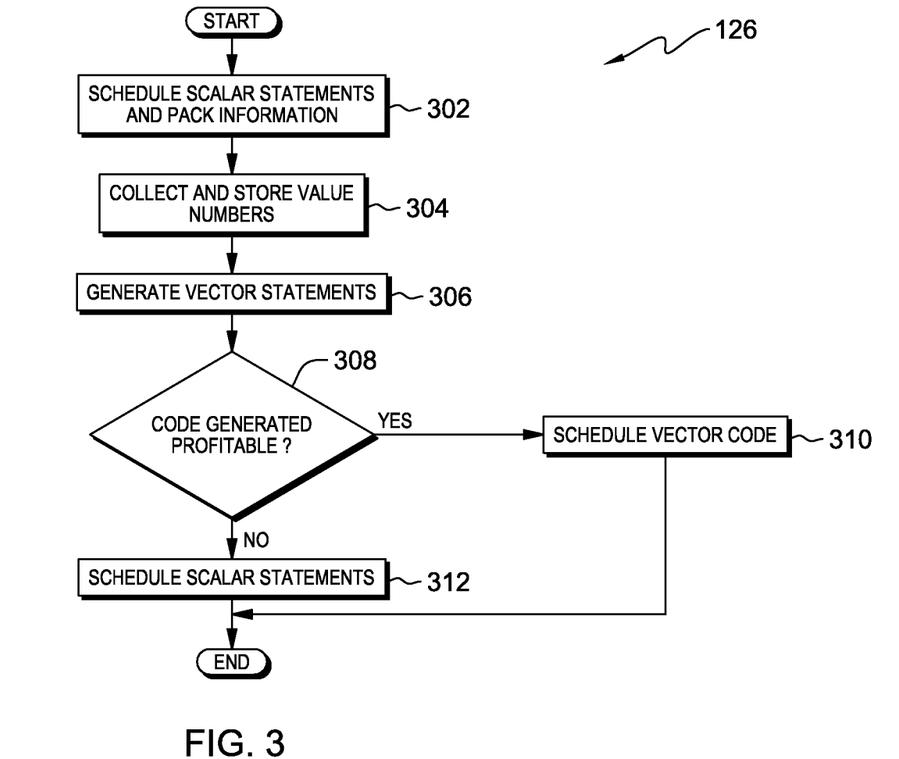
FIG. 3 is a flowchart depicting operational steps of a code generation module, for operation in conjunction with the analysis module of FIG. 2, in accordance with an embodiment of the present invention.

FIG. 3 is a flowchart depicting operational steps of a code generation module, operating in conjunction with the analysis module of FIG. 2, in accordance with an embodiment of the present invention.

Code generation module 126 schedules scalar statements and pack information (step 302). Code generation module 126 schedules the scalar statements, and for each pack determined by analysis module 124, records a scheduling location and adds information for scheduling after code generation and cost analysis.

Code generation module 126 collects and stores value numbers (step 304). During scheduling, value numbers being loaded from memory or stored to memory are collected. In an embodiment, the value number information is stored in a hash table and indexed by value number.

Code generation module 126 generates vector statements (step 306). During code generation, vector statements, for example, short SIMD statements, corresponding to each pack determined by analysis module 124 are generated. In an embodiment, during code generation for each vector load and store, code generation module 126 creates the corresponding vector of value numbers being loaded from or stored to memory, providing information about scalar value numbers that are reused in vectors.

Code generation module 126 determines whether the generated code is profitable (decision block 308). Code generation module 126 reviews information on the scalar value numbers in order to determine whether re-use opportunities may be lost by simdizing the code, and additionally reviews information on vector instructions generated, in order to determine expensive operations, for example, permute. Code generation module 126 gathers cost analysis information during code generation to determine whether the generated code is profitable and the information is precise because the cost and benefit of a pack is not only the cost and benefit of its individual pairs. Code generation module 126 reviews the information and analyzes the hardware the code is being compiled for, costs such as how many value numbers that could be reused if the code was in scalar form may be lost, benefits such as how many arithmetic or logical operations are saved by simdization, and other costs such as how many permutes or splats are needed to gather or scatter elements of a vector. Based on the profitability analysis, code generation module 126 determines whether or not to schedule the generated vector code or the original scalar code for each pack. In an embodiment, vector code may be generated only for those packs that are profitable.

If the generated vector code is profitable (decision block 308, "yes" branch), code generation module 126 schedules the vector code according to the scheduling information previously recorded (step 310). If the generated code is not profitable (decision block 308, "no" branch), code generation module 126 schedules the corresponding scalar statements (step 312).

Figure 4:
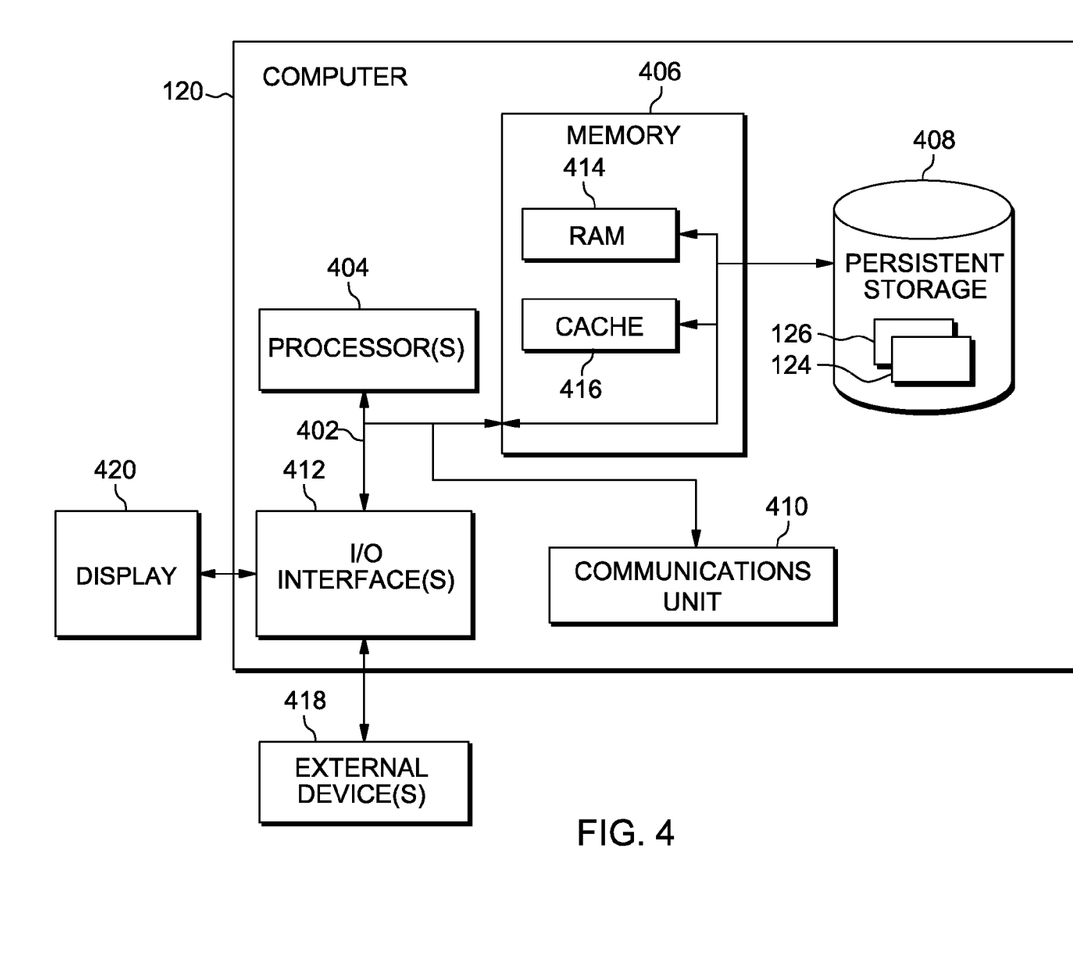
FIG. 4 depicts a block diagram of components of a data processing device, such as the computing system of FIG. 1, in accordance with an embodiment of the present invention.

FIG. 4 depicts a block diagram of components of host computing system 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Host computing system 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Analysis module 124 and code generation module 126 can be stored in persistent storage 408 for execution by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including target computing system 130. In these examples, communications unit 410 includes one or more network interface cards. Communications unit 410 may provide communications through the use of either or both physical and wireless communications links. Analysis module 124 and code generation module 126 may be downloaded to persistent storage 408 through communications unit 410.

I/O interface(s) 412 allows for input and output of data with other devices that may be connected to host computing system 120. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention, e.g., analysis module 124 and code generation module 126, can be stored on such portable computer readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or an external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, the method comprising:
   identifying, by one or more computer processors, one or more pairs of scalar statements;
   performing, by one or more computer processors, a cost analysis of operations of each of the one or more pairs of scalar statements to determine both a benefit and a cost of operations;
   determining, by one or more computer processors, based, at least in part, on the cost analysis, a gain for each of the one or more pairs of scalar statements;
   creating, by one or more computer processors, based, at least in part, on the gain, a sorted list of each of the one or more pairs of scalar statements;
   selecting, by one or more computer processors, based, at least in part, on the gain, a first pair from the sorted list;
   issuing, by one or more computer processors, a query to a hash table using a statement of the first pair;
   selecting, by one or more computer processors, from results received from the query, a second pair;
   extending, by one or more computer processors, based, at least in part, on the second pair, the first pair to create a pack;
   scheduling, by one or more computer processors, each of the one or more pairs of scalar statements, wherein during scheduling, one or more value numbers loaded from memory or stored to memory are collected;
   recording, by one or more computer processors, a scheduling location and a scheduling information for the created pack;
   generating, by one or more computer processors, one or more vector code statements corresponding to each created pack, wherein a corresponding vector for each of the one or more value numbers loaded from memory or stored to memory is created;
   performing, by one or more computer processors, a cost analysis of the scheduled one or more pairs of scalar statements, the cost analysis including determining how many of the one or more value numbers could be reused;
   performing, by one or more computer processors, a cost analysis of the generated one or more vector code statements, the cost analysis including whether reuse of the one or more value numbers would be lost; and
   comparing, by one or more computer processors, the cost analysis of the scheduled one or more pairs of scalar statements to the cost analysis of the generated one or more vector code statements.

2. The method of claim 1, wherein issuing, by one or more computer processors, a query to a hash table using a statement of the first pair further comprises:
   creating, by one or more computer processers, a first hash table and a second hash table, where for a given key, the first hash table returns a list of pairs with a first component equal to the key and where the second hash table returns a list of pairs with a second component equal to the key;
   issuing, by one or more computer processors, a query to each of the first hash table and the second hash table, where each query contains the key and the key is equal to a statement of the first pair; and
   receiving, by one or more computer processors, results of the query, the results including at least one list of pairs of scalar statements with the key as a component.

3. The method of claim 1, wherein extending, by one or more computer processors, based, at least in part, on the second pair, the first pair to create a pack further comprises:
   determining, by one or more computer processors, a data type size of the second pair;
   comparing, by one or more computer processors, the data type size of the second pair to a size of a register on a target computing platform; and
   determining, by one or more computer processors, the data type size of the second pair is less than the size of the register on the target computing platform.

4. The method of claim 1, further comprising:
determining, by one or more computer processors, based on the compared cost analysis, whether the generated one or more vector code statements are profitable; and
responsive to determining the generated one or more vector code statements are profitable, scheduling, by one or more computer processors, using the recorded scheduling location and the scheduling information, the generated one or more vector code statements for each created pack.

5. The method of claim 1, further comprising:
determining, by one or more computer processors, the created pack is complete; and
setting, by one or more computer processors, a used flag for each pair and for each statement included in the created pack.

\* \* \* \* \*